United States Patent

Karman

[15] 3,667,225
[45] June 6, 1972

[54] HYDROSTATIC DRIVE AND CONTROL SYSTEM THEREFOR

[72] Inventor: Lawrence P. Karman, Waynesville, Ohio

[73] Assignee: Scott Equipment Company, Dayton, Ohio

[22] Filed: Aug. 12, 1970

[21] Appl. No.: 63,218

[52] U.S. Cl..........................................60/52 VS, 60/DIG. 2
[51] Int. Cl.......................................................F15b 15/18
[58] Field of Search .................60/52 R, 53 R, 52 VS, DIG. 2

[56] References Cited

UNITED STATES PATENTS

| | | | |
|---|---|---|---|
| 2,977,765 | 4/1961 | Fillmore | 60/DIG. 2 |
| 3,438,201 | 4/1969 | Nash et al. | 60/DIG. 2 |
| 3,542,274 | 11/1970 | Miller | 11/53 R |

Primary Examiner—Edgar W. Geoghegan
Attorney—Marechal, Biebel, French & Bugg

[57] ABSTRACT

An electro-hydraulic system controls the position or movement of a fixed displacement hydraulic motor, such as a piston motor, in accordance with predetermined desired rates of movement or positions thereof, and employs a variable displacement drive pump having a movable swash plate. The position of the swash plate is controlled by an electrical control circuit including a series of inputs which represent either a desired position of the motor or a desired pump output. Means are provided for selecting between primary feedback indicative of the position of the swash plate or secondary feedback indicative of the position of the motor or device being controlled.

1 Claim, 2 Drawing Figures

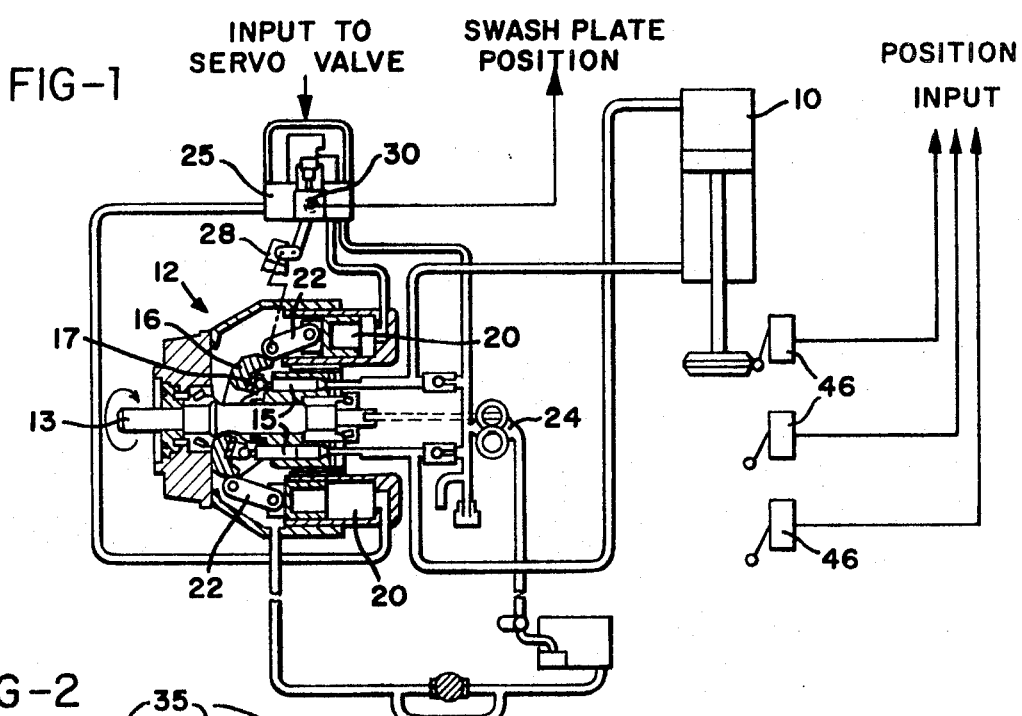
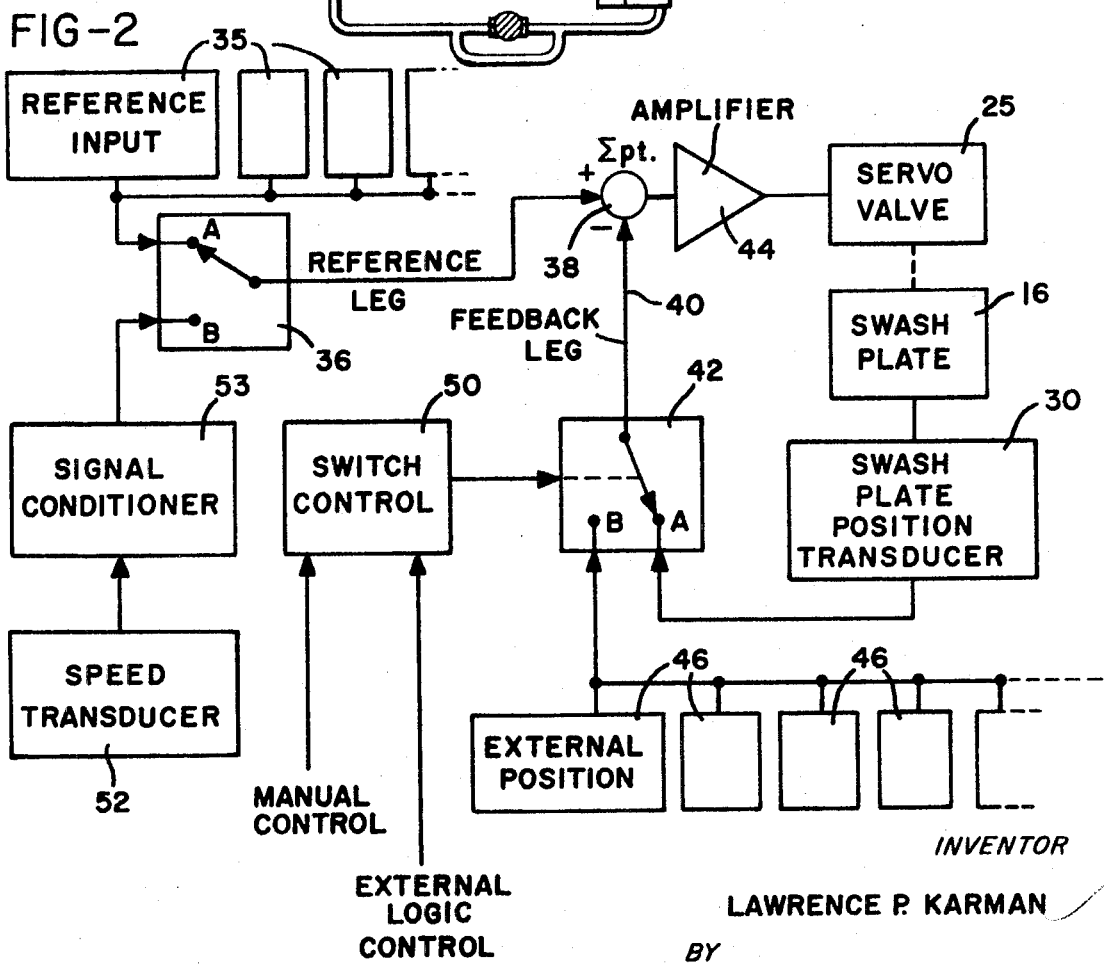

HYDROSTATIC DRIVE AND CONTROL SYSTEM THEREFOR

BACKGROUND OF THE INVENTION

The present invention relates to the art of hydraulic control and more particularly to electro-hydrostatic apparatus for controlling the position of a fixed displacement hydraulic motor, such as a linear piston motor, or some other form of linear or rotating fixed displacement motor. Swash plate types of variable displacement pumps have been used for controlling the position of such motors and such pumps have been, in turn, controlled by electrical control systems as shown in U.S. Pat. Nos. 3,107,490 and 3,365,886. However, such systems have been tailored to a particular use, and have lacked versatility.

SUMMARY OF THE INVENTION

A variable displacement swash plate pump has its output connected to apply hydraulic fluid to the motor being controlled. The position of the swash plate is applied to an electro-mechanical transducer through a suitable mechanical linkage. A versatile control system controls the electro-mechanical servo valve in accordance with either manual or logic-switched analogue or digital inputs which may represent either a desired position or velocity of the motor being controlled or a desired position of the swash plate (output) of the variable displacement pump. Selection is further provided in the feedback circuit between a primary loop in which the swash plate position feedback is applied to the amplifier circuit, or a secondary loop in which a motor position or velocity feedback input is applied. Further, provision is included for slaving the drive to another drive.

More particularly, servo pistons are used to position the swash plate, and the hydraulic fluid being fed to the servo pistons is controlled both in direction and in velocity by the electrically operated servo valve. The position of the servo valve spool is, in turn, dictated by a linear torque motor which receives its input signals from the amplifier circuit.

Both primary and secondary feedback loops are provided, a primary feedback loop is indicative of the actual position of the swash plate of the variable displacement pump and controls the velocity of the driven motor. One or more secondary feedback loops are provided for accurate control over the actual movement of the driven motor.

The control system of the present invention may be used for programming the position, for example, of hydraulic presses to various stroke speeds or positions. The input command can be readily changed for varying the desired operational conditions. Manual or external logic switch control may be used to control the operation of the system.

BRIEF DESCRIPTION OF THE DRAWINGS

FIG. 1 is a diagram primarily of the hydraulic circuit of the invention including a schematic showing of the variable displacement pump; and FIG. 2 is a block diagram of the electrical control system of the invention.

DESCRIPTION OF THE PREFERRED EMBODIMENT

Referring to FIG. 1, a linear motor controlled by the present invention is illustrated at 10 as comprising a two-way hydraulic piston motor. Obviously, this motor 10 may be a reversible rotary hydraulic motor, if desired. The motor 10 may be part of a hydraulic press, the stroke or position of which is to be controlled by the apparatus of the present invention.

The drive system for the motor 10 includes a variable displacement pump which is indicated generally at 12 of FIG. 1. The pump is preferably of the positionable swash plate type and may be made as shown in U.S. Pat. Nos. 3,212,263 or 3,282,225. It includes an input shaft 13 which is driven from some suitable external source at a constant speed, such as by an electric motor. The pump pistons 15 in turn rotate with the shaft 13, and the displacement thereof is determined by the position of the swash plate 16 through a slipper arrangement 17.

The position of the swash plate 16 is determined by a pair of hydraulic piston motors 20 which are connected to operate the swash plate and position it angularly through linkage 22. The pistons 20 are connected to a source of hydraulic fluid under pressure as developed by a charge pump 24. The charge pump 24 delivers oil under pressure to a servo valve indicated generally at 25 in FIG. 1. The valve 25 is, in turn, connected to direct such fluid under pressure selectively to the pistons 20. The valve 25 is of the electro-servo type in which an input electric signal is applied to a linear torque motor and the output of such torque motor is, in turn, applied to move the spool of the valve. Such a valve may be constructed according to the patent of Moog U.S. Pat. No. 3,228,423 of 1966, or, may be of the model DSVHS-400 of Manatrol Division, Perry-Fay Company, 200 Perry Court, Elmira, Ohio.

Means for providing an electrical signal representative of the actual position of the swash plate includes a toggle linkage 28 connected to rotate a precision potentiometer 30. The linkage 28 controls the position of the potentiometer 30 in accordance with the actual position of the swash plate 16.

As stated above, the position of the motor 10 can be controlled in accordance with a series of preconditions which may be manually or logically applied. The circuit diagram illustrated in FIG. 2 is connected to control the valve 25 in accordance with such reference input. For this purpose, one or more inputs 35 may be applied through a switch 36 to a summing point which may be a comparator circuit 38. The input 35 may be actuated in accordance with a desired position of the motor 10 being controlled or may be controlled by a timing circuit. The reference input may consist of individual precision potentiometers which have settings which correspond to actual swash plate positions.

The second input to the comparator circuit 38 consists of an input voltage on a line 40 through a switch 42 which is representative of a desired feedback signal. On the one hand, where velocity control of the motor 10 is desired and where precise positioning of the motor is not paramount, the feedback may consist of the signal from the swash plate position transducer or potentiometer 30. Accordingly, the difference or "error" signal is applied by an amplifier 44 to the servo valve 25 until the position of the swash plate as transmitted by the potentiometer 30 is equal to the input from one of the reference inputs 35. This may represent a desired pump output.

Where accurate position control is desired, the switch 42 is connected to apply on line 40 a signal from one or more selected external position transducers 46. These may comprise individual switches which are positioned to be responsive to individual positions of the motor 10, as shown diagrammatically in FIG. 1. The switch 42 may be controlled either manually or by an external logic control, as illustrated at 50 of FIG. 1.

From time to time it may be desirable to control the motor 10 in accordance with the rotational speed or position of a second motor. For this purpose, the switch 36 may be actuated to connect the reference line to the comparator circuit 38 to a speed transducer 52 connected to the other motor and through a signal conditioning circuit 53.

The operation of the invention is largely self evident from the foregoing description. When it is desired to operate the motor 10 in accordance with the predetermined series of inputs which can be represented by the corresponding series of swash plate positions, the reference inputs 35 are selectively applied either manually or by an external logic circuit through the switch 36 to the comparator 38 which, in turn, applies the error signal by an amplifier 44 to the servo valve 25. The valve 25 is then operated to direct pressure from the charge pump 24 to the appropriate one of the pistons 20 so as to position the swash plate to apply pump output to one or the other of the inputs of the motor 10. The position into which the swash plate will be moved will determine the output of the unit 12 and thus will determine the velocity of movement of the motor 10. The actual swash plate position is fed back into the comparator 38 by the swash plate position transducer 30. In this manner, a desired velocity of movement of the motor 10 may be obtained.

Superimposed on this operation, it may be desirable at a particular point to stop further movement of the motor 10 in accordance with predetermined positions. Thus, the switch 42 may be operated by the circuit 50 to connect a selected one of the external position inputs 46. The actual swash plate position will then be controlled in accordance with the magnitude of the error signal and the swash plate will be moved to the neutral position when the inputs to the comparator 38 are balanced.

It is accordingly seen that this invention provides a versatile control device for controlling the velocity or the positioning of a fixed displacement hydraulic motor. The same system may be used to control a wide variety of conditions, thus providing versatility and ease of set-up for machine tools and the like. The output motor 10 may consist of a high torque motor which, in many cases, eliminates the need for gear reduction units. Where precise control of output speed or position is required, the feedback transducers may be coupled directly to the motor being controlled, thus providing a signal for the secondary feedback movement. The input commands defined by the referenced input 35 can be readily changed for varying operational requirements.

While the form of apparatus herein described constitutes a preferred embodiment of the invention, it is to be understood that the invention is not limited to this precise form of apparatus, and that changes may be made therein without departing from the scope of the invention.

What is claimed is:

1. A control system for controlling the position or rate of displacement of a hydraulic motor in accordance with predetermined desired motor movements or positions comprising a variable displacement drive pump having a positionable swash plate for controlling the output of said pump, a charge pump circuit, an electro-hydraulic servo valve connected selectively to direct hydraulic fluid from said charge pump circuit to control the position of said swash plate, an electric feedback transducer providing a primary feedback signal of actual swash plate position, means defining a series of input function signals representing a corresponding series of desired motor control functions, means forming a comparator circuit having a first input connected to receive said desired function signals and having a second input, means defining a series of secondary feedback signals corresponding to actual positions of said motor, and switch means selectively applying the output of said electric transducer or the output of said series of secondary feedback signals to said comparator circuit second input, and amplifier means connecting the output of said comparator circuit to said electro-hydraulic valve for controlling said valve in accordance with the difference between the inputs to said comparator circuit.

* * * * *